(12) United States Patent
McNeill et al.

(10) Patent No.: US 9,047,884 B2
(45) Date of Patent: Jun. 2, 2015

(54) DATA READER WITH HORIZONTAL LAMINATION SHIELD

(71) Applicant: Seagate Technology LLC, Cupertino, CA (US)

(72) Inventors: Kevin McNeill, Derry (GB); Peter McGeehin, Letterkenny (IE); Marcus Ormston, Derry (GB); Aidan Goggin, Redcastle (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/960,394

(22) Filed: Aug. 6, 2013

(65) Prior Publication Data

US 2015/0043107 A1 Feb. 12, 2015

(51) Int. Cl.
*G11B 5/39* (2006.01)
*G11B 5/11* (2006.01)

(52) U.S. Cl.
CPC ........ *G11B 5/11* (2013.01); *G11B 5/398* (2013.01); *G11B 5/3912* (2013.01)

(58) Field of Classification Search
CPC ...... G11B 5/3912; G11B 5/398; G11B 5/112; G11B 5/11; G11B 5/39; G11B 5/3903; G11B 5/3906
USPC ......................................................... 360/319
See application file for complete search history.

(56) References Cited

U.S. PATENT DOCUMENTS

| | | | |
|---|---|---|---|
| 5,208,715 A * | 5/1993 | Mowry | 360/319 |
| 5,761,009 A * | 6/1998 | Hughbanks et al. | 360/323 |
| 6,018,443 A | 1/2000 | Watanabe et al. | |
| 7,086,138 B2 | 8/2006 | Anderson | |
| 7,518,825 B2 * | 4/2009 | Nishida et al. | 360/125.2 |
| 7,606,007 B2 | 10/2009 | Gill | |
| 7,843,667 B2 * | 11/2010 | Hirata et al. | 360/319 |
| 7,848,062 B2 * | 12/2010 | Guan et al. | 360/319 |
| 8,194,360 B2 | 6/2012 | Macken et al. | |
| 8,243,399 B2 * | 8/2012 | Garfunkel et al. | 360/319 |
| 8,322,023 B1 | 12/2012 | Zeng et al. | |
| 2005/0185345 A1 * | 8/2005 | Ding et al. | 360/319 |
| 2006/0209469 A1 * | 9/2006 | Akimoto | 360/319 |
| 2007/0002502 A1 * | 1/2007 | Burbank et al. | 360/319 |
| 2007/0109691 A1 * | 5/2007 | Machita et al. | 360/319 |
| 2007/0242392 A1 * | 10/2007 | Benakli | 360/319 |
| 2008/0002306 A1 * | 1/2008 | Otagiri et al. | 360/319 |
| 2008/0225442 A1 * | 9/2008 | Hirose et al. | 360/319 |
| 2009/0034130 A1 * | 2/2009 | Garfunkel et al. | 360/319 |
| 2009/0290264 A1 * | 11/2009 | Ayukawa et al. | 360/313 |
| 2011/0051291 A1 * | 3/2011 | Miyauchi et al. | 360/245.3 |
| 2012/0281320 A1 | 11/2012 | Singleton et al. | |

FOREIGN PATENT DOCUMENTS

| | | | | |
|---|---|---|---|---|
| JP | 2006252756 A | * | 9/2006 | |
| JP | 2009070543 A | * | 4/2009 | |
| JP | 2010027132 A | * | 2/2010 | |

* cited by examiner

*Primary Examiner* — Will J Klimowicz
(74) *Attorney, Agent, or Firm* — Hall Estill Attorneys at Law

(57) ABSTRACT

A data storage device may be constructed to sense data bits with at least a magnetic stack contacting a shield that has a horizontal lamination of magnetic and non-magnetic layers. The magnetic layer may be configured with a first width at an air bearing surface (ABS) that defines a first aspect ratio and a different second width that defines a different second aspect ratio distal the ABS.

20 Claims, 3 Drawing Sheets

DATA READER WITH HORIZONTAL LAMINATION SHIELD

SUMMARY

A data storage device generally capable of distinguishing between data bits is generally recited in various embodiments herein.

In accordance with various non-limiting embodiments, a magnetic stack may contact a shield that is configured as a horizontal lamination of magnetic and non-magnetic layers where the magnetic layer has a first width at an air bearing surface (ABS) that defines a first aspect ratio and a different second width that defines a different second aspect ratio distal the ABS.

DETAILED DESCRIPTION

The minimization of data storage devices and their constituent components has stressed the operational capabilities and reliability of the devices in an effort to increase data storage capacity and data access times. With data bits being stored more closely together on rotating data storage media, the robustness of a data storage device's magnetic shields can correspond to the speed and accuracy of data sensing and programming. However, reducing the physical dimensions of components like data readers, magnetic shields, and data writers can induce thermo mechanical consequences, such as magnetic instability and inadvertent magnetostatic interactions, which may degrade device performance and hinder the advancement of data storage devices towards smaller physical sizes. Hence, a continued industry goal is to increase stability and robustness of storage device components, especially those constructed with reduced form factors.

These issues and industry goal has rendered an example data storage device with at least a magnetic stack contacting a shield that is configured as a horizontal lamination of magnetic and non-magnetic layers where the magnetic layer has a first width at an air bearing surface (ABS) that defines a first aspect ratio and a different second width that defines a different second aspect ratio distal the ABS. The composite shield can increase magnetic field robustness by allowing the magnetic layer to be tuned for size, material, and shape without degrading thermo mechanical performance of the data storage device. An ability to construct the magnetic and non-magnetic layers of the horizontal lamination shield in a variety of different configurations further allows the magnetic layer in contact with the magnetic stack to be specifically tailored to the type, configuration, and operation of the magnetic stack without possible interference from magnetically volatile device features, such as electrical leads and biasing magnets.

Figure 1:
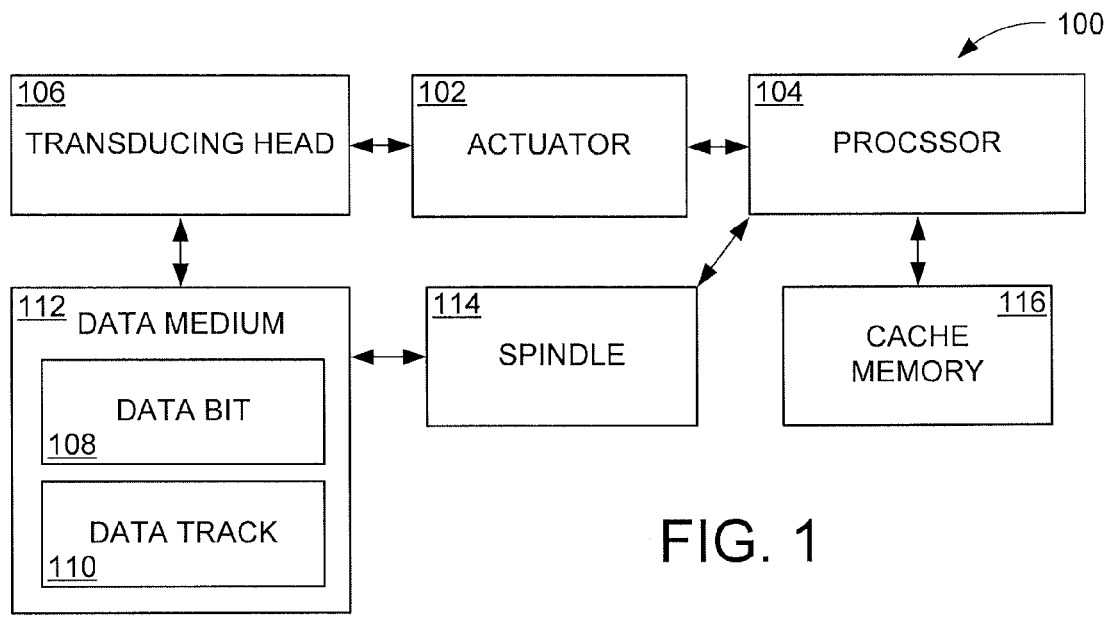
FIG. 1 displays a block representation of an example data storage system configured and operated in accordance with various embodiments.

FIG. 1 provides a block representation of an example data storage system 100 that may be used in a variety of computing environments, like cloud networks and mobile electronics, in accordance with various embodiments. The data storage device 100 can have at least one an actuator 102 that is controlled by a processor 104 to position a transducing head 106 over programmed data bits 108 present on data tracks 110 of a magnetic storage medium 112. The processor 104 may concurrently control a spindle motor 114 to rotate the data medium 112 and produce an air bearing surface (ABS) on which the transducing head 106 floats to interact with the data bits 108.

The transducing head 106 may be constructed with one or more transducing elements, such as a magnetic writer and magnetically responsive reader, which operate to program data to and read data bits 108 from the data medium 112, respectively. In this way, controlled motion of the actuator 102 and spindle motor 114 can modulate the position of the transducing head 106 both laterally along the data tracks 110 and vertically as measured by the size of the air bearing to selectively write, read, and rewrite data. In some embodiments, the processor 104 communicates with at least one cache memory 116 that may be positioned locally or remotely across a wired or wireless network. Such cache memory 116 may be configured as a solid-state memory array that provides fast data output capabilities and works in concert with the long-term storage of the data medium 112 as a hybrid data storage device.

Figure 2:
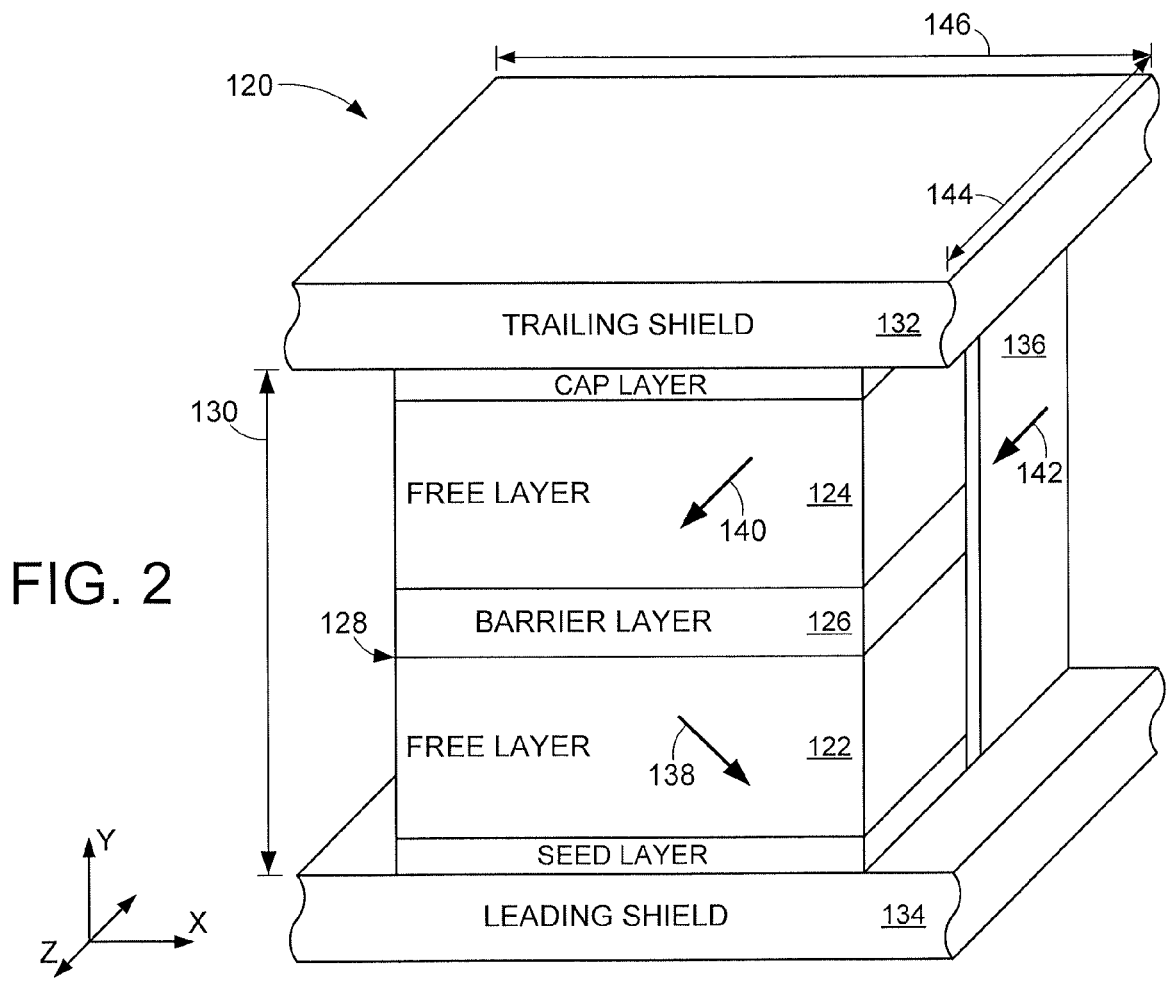
FIG. 2 is an isometric view of an example portion of a data storage device capable of being used in the data storage system of FIG. 1.

While the data storage system 100 is not limited to a particular mechanism for writing and reading the data bits 108, assorted embodiments utilize a magnetoresistive element that can quickly and accurately access data bits of miniscule physical sizes. FIG. 2 generally displays an isometric block representation of a portion of a data reader 120 that may be implemented into a data storage system like the system 100 of FIG. 1. The data reader 120 may be characterized as a trilayer sensor due to first 122 and second 124 magnetically free layers contacting opposite sides of a non-magnetic barrier layer 126 on an air bearing surface (ABS) as part of a magnetic stack 128.

Configuring the data reader 120 with dual magnetically free layers and no fixed magnetization reference structure, such as an antiferromagnetic layer or permanent magnet, allows the shield-to-shield spacing 130 between the trailing 132 and leading 134 shields to be minimized. Placement of a bias magnet 136 adjacent to and separated from each free layer 122 and 124 can induce default magnetization orientations 138 and 140 in the respective free layers 122 and 124 that provides consistent and reliable magnetic response to encountered data bits. The bias magnet 136 may be configured with a greater thickness along the Y axis than the magnetic stack 128 by continuously extending into notches of the trailing 132 and leading 134, distal to the ABS, to allow a sufficiently strong bias magnetization 142 to set the free layer default magnetizations while allowing the free layers to respond to external data bits.

The default magnetizations 138 and 140 of the free layers 122 and 124 can be set to predetermined strength by magnetostatic coupling and interlayer coupling between the first 122 and second 124 free layers. The magnetostatic coupling relates to the shape anisotropy of the magnetic materials and depends on the aspect ratio of top and bottom free layers respectfully. The predetermined orientation and strength of the default magnetizations 138 and 140 can allow the free layers to respectively rotate, or scissor, in response to encountered data bits to produce a data signal. As the magnetic stack 128 is reduced in physical size, such as shield to shield spacing 130, the free layer magnetizations 138 and 140 are more susceptible to fluctuation by sensing errant magnetic fields, which can be increasingly prevalent and strong in high areal density data storage devices.

In such high areal density devices, the leading 134 and trailing 132 shields are tasked with keeping unwanted magnetic fields from reaching and affecting magnetic stack 128 sensing accuracy. However, a shield with a large aspect ratio, such as 5:1, where the shield length 144 from the ABS is less than the shield width 146 may provide robust shielding against downtrack magnetic fields, along the Y axis, but may suffer from poor crosstrack shielding. While a reduction in shield aspect ratio may increase the crosstrack shielding capabilities, such reduction can diminish the downtrack shielding robustness. Accordingly, a shield that can be tuned with multiple different aspect ratios can be robust against both crosstrack and downtrack errant magnetic fields, even in reduced form factor dimensions associated with high areal density data storage environments.

It should be noted that while a trilayer magnetic stack 128 is illustrated in FIG. 2, other types of magnetoresistive laminations, such as abutted junctions, can have diminished performance due to single high aspect ratio magnetic shields. It should also be noted the term "stack" is an unlimited term within this disclosure that can be one or more vertically and horizontally aligned layers, constructed of magnetic and non-magnetic material that are capable of magnetic reading and writing. Throughout the present application, the term "stack" will be understood to mean a component that is constructed to respond to external data bits to provide access to external data bits in any operational environment. For example, but not in any way limiting, a magnetic stack may be a data read or write configuration that can differentiate between a plurality of data bits.

Figure 3:
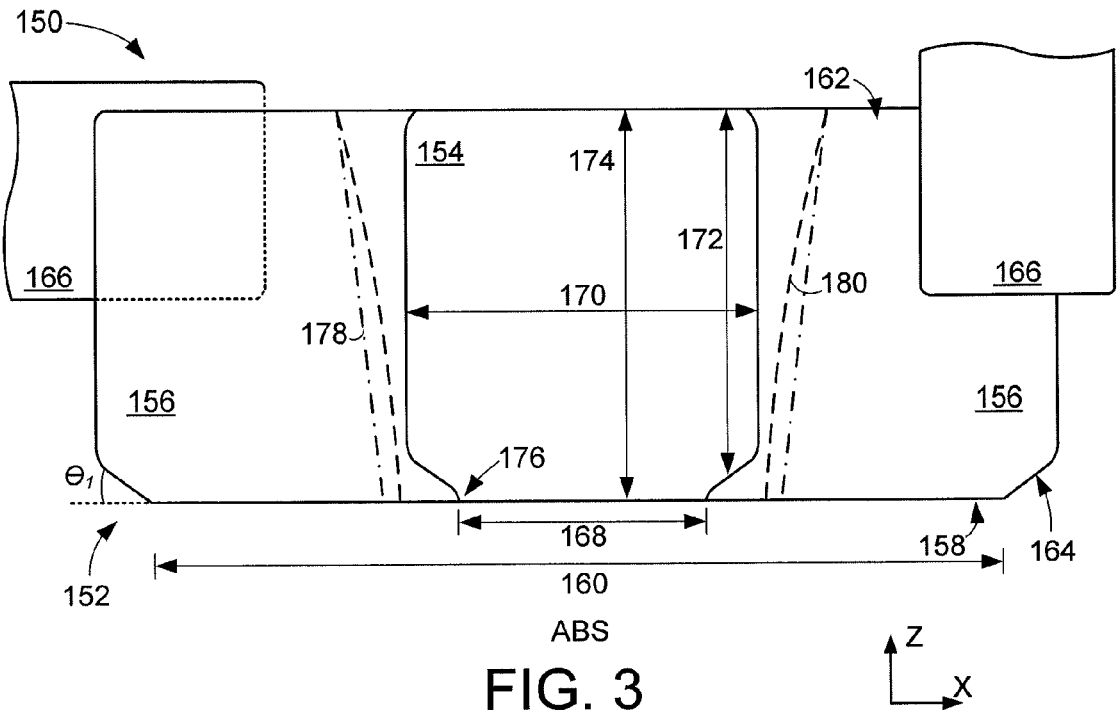
FIG. 3 shows a top view block representation a portion of an example data reader configured in accordance with various embodiments.

FIG. 3 displays a top view block representation of an example data reader 150 configured in accordance with some embodiments to utilize a horizontal lamination shield 152 that may be tuned to provide multiple aspects ratios and robustness against both crosstrack and downtrack stray magnetic fields. The composite shield 152 is constructed with a magnetic shield layer 154 disposed between non-magnetic layers 156 in an overall shield configuration that is shaped to have a narrow region 158 defined by an ABS width 160 at the ABS and a wide region 162 positioned distal the ABS. As shown, a transition feature 164 translates the ABS width 160 to a wider width along the X axis via a curved surface that extends at a predetermined angle $\theta_1$ to the ABS, but such configuration is not required to limiting as the transition feature may be shaped in any number of ways.

Disposing the magnetic shield layer 154 between the non-magnetic layers 156 allows the magnetic shield to be separated from any electrical contacts 166, which removes topography from the magnetic shield layer 154 that may induce magnetic instability in the shield 152 by making magnetic domain configurations more complex. With the electrical contacts 166 contacting the non-magnetic layers 156 on opposite magnetic shields, such as leading and trailing shields, an electrical path through the data reader 150 can pass through as little of the magnetic shield layer 154 as possible to minimize electrical disruption of any shielding capabilities. In various embodiments, the non-magnetic layers 156 are each constructed of a nickel alloy like NiP or $Ni_{50}Cu_{50}$ that have a coefficient of thermal expansion (CTE) of approximately 14.5 ppm/° C. and a roughly 250 MPa tensile strength while the magnetic shield layer 154 is Permalloy that has a CTE of about 11.5 ppm/° C. and 250 MPa tensile strength, but such material configurations are not required or limiting.

The position of the magnetic shield layer 154 within the areal extent of the non-magnetic layers 156 allows for aspect ratio tuning, as shown, where a first width 168 is present at the ABS and a second, wider width 170 is located distal the ABS. The tuning of these different widths 168 and 170 combined with the respective lengths 172 and 174 of the widths provides differing aspect ratios that can provide concurrent and complementary shielding characteristics. That is, the wider magnetic shield width 170 corresponds with a larger aspect ratio than the portion of the shield 154 defined by width 168 and efficiently shields stray magnetic fields in the downtrack direction while the smaller aspect ratio portion of the shield 154 efficiently shields stray magnetic fields in the crosstrack direction.

The combination of different aspect ratios in a single continuous magnetic shield layer 154 provides promising operational capabilities for the data reader 150 by sustaining thermo mechanical performance as the non-magnetic layers 156 influence the overall shield 152. The differing magnetic shield lengths 172 and 174 are connected via a conversion feature 176 that allows the respective shield widths 168 and 170 to be uniform and continuous for a majority of the respective lengths 172 and 174. While the substantially rectangular configuration of the various portions of the magnetic shield layer 154 can provide concurrently different aspect ratios, such configuration is not required or limiting as an unlimited variety of magnetic shield layer sidewall shapes can be utilized.

For example, the magnetic shield layer 154 can have linear sidewalls 178 canted at a predetermined angle with respect to the ABS or continuously curvilinear sidewalls 180. Regardless of the shape and orientation of the magnetic shield sidewalls, providing multiple aspect ratios in the magnetic shield layer 154 by tuning the sidewalls to have differing widths 168 and 170 at the ABS and distal the ABS can correspond with optimized shield performance. Such shield tuning may, in some embodiments, encompass constructing separate shields of a data reader, such as leading and trailing shields, with different aspect ratios, magnetic layer sidewall shapes, and magnetic layer widths.

Figure 4:
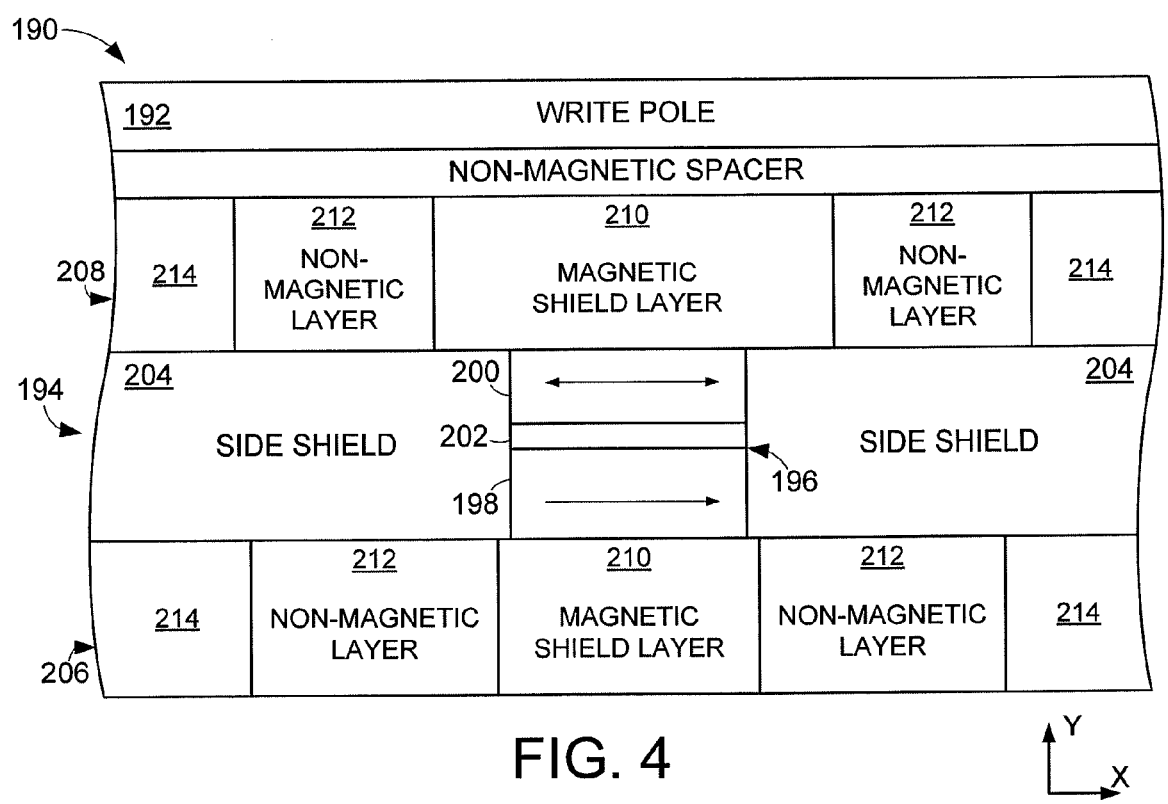
FIG. 4 provides an ABS view block representation of a portion of an example data reader constructed and operated in accordance with some embodiments.

FIG. 4 displays an ABS view block representation of a portion of an example transducing head 190 that is configured in accordance with assorted embodiments and is illustrated as a visual representation that does not reflect any scale or dimension of an actual transducing head constructed to utilize the various embodiments. The head 190 has a write pole 192 portion of a data writer that can be physically connected to, but magnetically separated from a data reader 194 by a non-magnetic spacer layer. The data reader 194 has a magnetic stack 196 that utilized both fixed 198 and free 200 magnetization structures that are separated by a barrier layer 202 to sense data bits across the ABS. The magnetic stack is laterally disposed between side shields 204 along the X axis and vertically disposed between leading 206 and trailing 208 shields along the Y axis.

The leading 206 and trailing 208 shields each are constructed as composite horizontal laminations with a magnetic shield layer 210 contacting opposite sides of the magnetic stack 196. The magnetic shield layers 210 can respectively be configured with multiple different aspect ratios that may be similar or dissimilar, as discussed above. Each magnetic shield layer 210 is laterally surrounded by non-magnetic layers 212 that serve to buffer the magnetic shield layers 210 and mitigate thermo mechanical deterioration. The leading 206 and trailing 208 shields each also have an additional shield layer 214 that may be constructed as magnetic or non-magnetic material and positioned laterally adjacent to the magnetic shield layer 210, but separated by the non-magnetic layer 212. The addition of the additional shield layers 214 may be tuned for shape, size, and position to provide supplemental shielding in some embodiments. However, other embodiments may omit one or both additional magnetic shield layers 214 from the respective leading 206 and trailing 208 shields to allow increased non-magnetic layer 212 surface area.

As illustrated in a non-limiting embodiment, the widths of the constituent layers of the leading 206 and trailing 208 shields are different and may be tuned to provide diverse downtrack shielding along the Y axis at the ABS in accordance with assorted embodiments. In yet, some embodiments configure the leading 206 and trailing 208 shields to match in material, number of layers, layer width, and layer position. Such variety of tuning possibilities allows the transducing head 190 to be configured to accommodate a wide range of data storage environments that posed assorted stray magnetic field situations, like bit patterned media and high data bit density data storage environments.

Figure 5A:
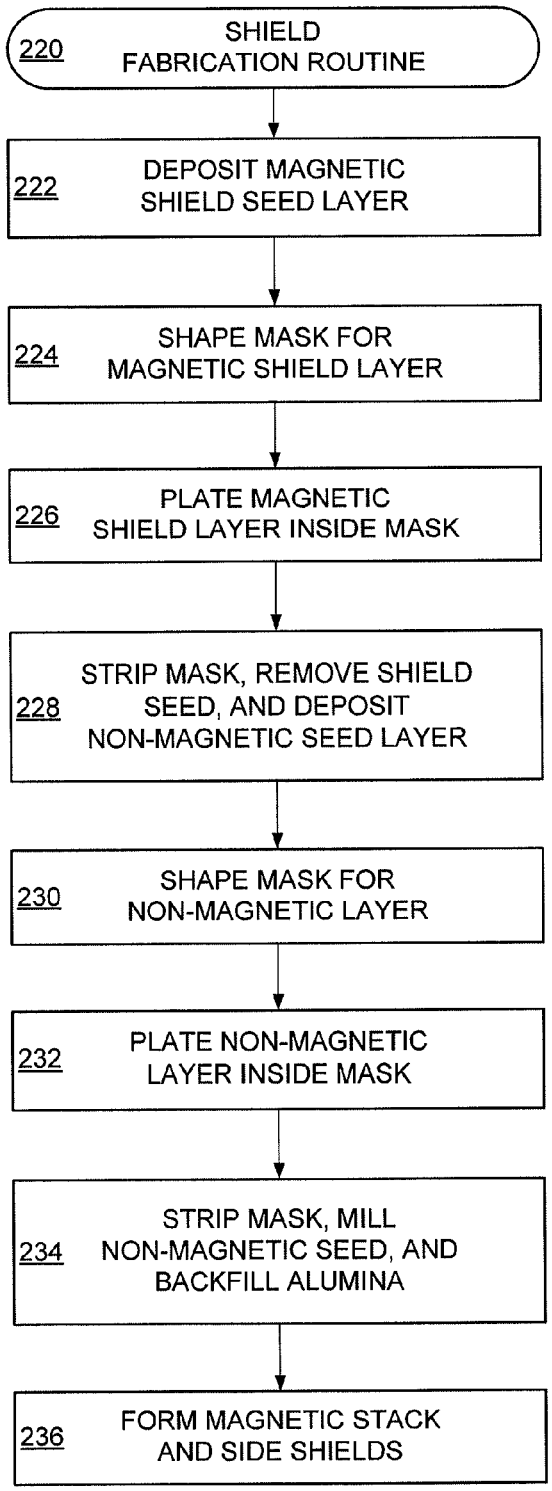
FIGS. 5A and 5B respectively map and illustrate an example shield fabrication routine carried out in accordance with various embodiments.
Figure 5B:
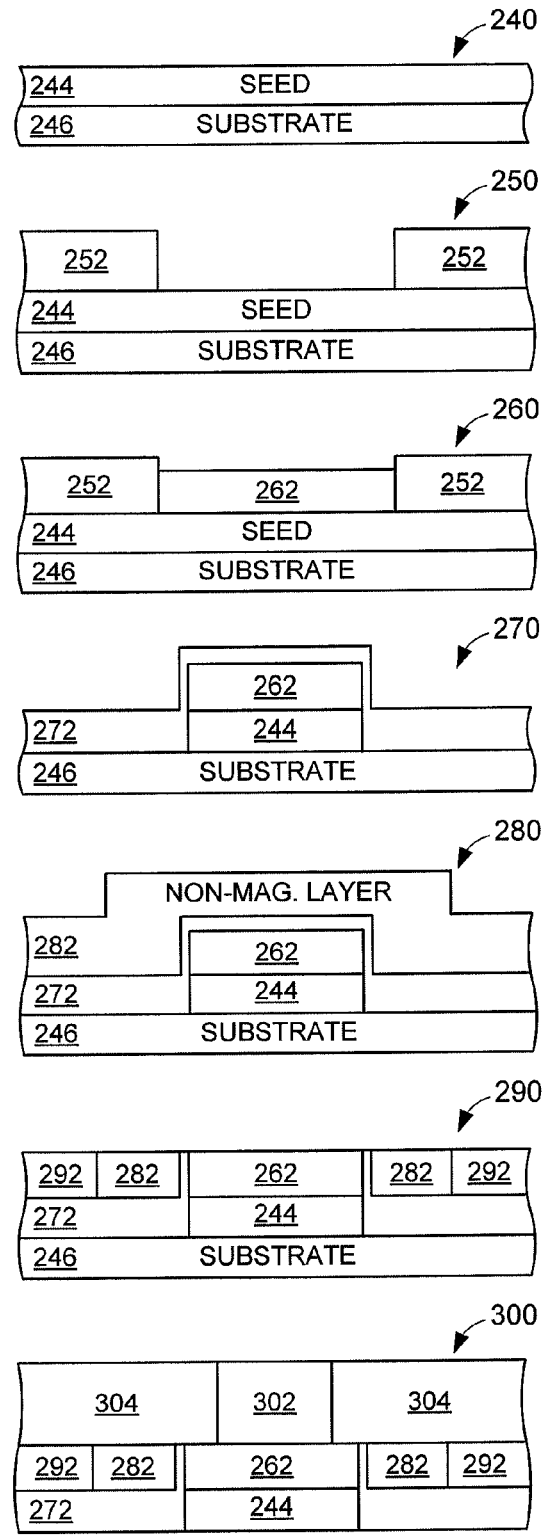

FIGS. 5A and 5B respectively provide a flowchart and associated exemplary block representations of an example shield fabrication routine carried out in accordance with some embodiments. Step 222 of FIG. 5A begins by depositing a magnetic shield seed layer, which corresponds with lamination 240 of FIG. 5B where a magnetic seed 244 is positioned atop a substrate 246. It should be noted that the seed layer 244 may be formed atop of any underlying surface, such as a side shield, and is not required to be deposited on top of a particular substrate material. As such, the magnetic seed layer 244 can be used to form a leading and trailing shield of a data transducing element.

Step 224 next shapes a mask, such as a photoresist mask 252 of representative lamination 250, to define a magnetic shield layer. Step 224 may involve at least forming a plurality of different aspect ratio regions with shaped shield sidewalls, which may be similar or dissimilar to the sidewalls 178 and 180 of FIG. 3. Lamination 260 illustrates a single, continuous magnetic shield layer 262 that is plated inside the existing mask in step 226. Various embodiments may form a vertical lamination of dissimilar magnetic layers of which layer 262 is a part via step 226.

The formation of the magnetic shield layer 262 advances routine 220 to step 226 where the existing mask is stripped, portions of the shield seed 244 are milled, and a non-magnetic seed material is deposited, which is represented in lamination 270 by non-magnetic seed 272. The non-magnetic seed material may or may not be the same as the magnetic seed layer 244, but assorted embodiments use dissimilar materials and surface roughnesses in the magnetic and non-magnetic seed layers, respectively, to induce different operational characteristics, such as anisotropy strength and direction. As shown in lamination 270, the non-magnetic seed layer 272 can be deposited to continually coat the underlying layers, including vertical sidewalls of the magnetic shield layer 262, with at least a predetermined thickness so that the non-magnetic seed is continuous between opposite sides of the magnetic shield layer 262.

With the non-magnetic seed layer 272 established, step 230 of FIG. 5A shapes another mask to define the extent of a non-magnetic layer that is subsequently plated in step 232 to form a non-magnetic layer that is represented in lamination 280 as layer 282. While a mask is called for in step 230, some embodiments form the non-magnetic layer without a mask. Much like the non-magnetic seed layer 272, the non-magnetic layer 282 can continuously extend to opposite sides of the magnetic seed layer 262 before any masks are stripped, the non-magnetic layer and non-magnetic seed are milled into a predetermined shape, and portions of have been removed are then backfilled with non-magnetic material, like Alumina.

Lamination 290 provides an example shield configuration after step 234 in which a top surface of the magnetic shield layer is planar with both the non-magnetic layer 282 and the backfilled Alumina 292. The planar top surface of horizontal lamination shield illustrated in lamination 290 may be utilized to form any number of supplemental layers, such as a non-magnetic spacer and write pole, in the event the composite shield is a trailing shield. With lamination 300 of FIG. 5B and step 236 of routine 220, the composite shield positioned as a leading shield that is positioned uptrack of a magnetic stack 302 that is disposed between magnetic side shields 304. Step 236 is not limited to a particular type or size of magnetic stack, but may be constructed as a trilayer data sensing stack in some embodiments and as a fixed magnetization containing abutted junction sensing stack in other embodiments.

It can be appreciated with lamination 300 that the composite leading shield can be complemented by another composite trailing shield, such as the configuration shown in FIG. 4. The addition of another horizontal lamination shield can start routine 220 anew with step 222 depositing a magnetic seed layer atop the planar top surface of the magnetic stack 302 and side shields 304. With the revisiting of each of steps of routine 220, various materials, shapes, and positions of the various constituent layers can be altered differently from the composite leading shield illustrated in lamination 300. For example, a trailing composite shield may add a step to routine 220 that removes portions of the non-magnetic seed layer 272 that separates the non-magnetic layer 282 from the magnetic shield layer 262. As such, the routine 220 and lamination 300 are not limiting and can be modified at will to produce a variety of differently tuned shields and data reader configurations.

The tuning of one or more shields in a data transducing element can provide a composite, horizontal lamination shield with both magnetic and non-magnetic layers that can provide robust crosstrack and downtrack magnetic field shielding. Positioning non-magnetic material on opposite sides of a magnetic layer in a composite shield can allow features like electrical contacts to connect with the non-magnetic portions of the shield without adding magnetic domain complexity to the magnetic shield layer portion of the shield. The various layers of the composite shield can be tuned for shape and material to provide multiple different aspect ratios that simultaneously act to provide optimized magnetic shielding across a plurality of planes with respect to a magnetic stack.

While the various embodiments have been directed to shields for magnetic sensing, it will be appreciated that the embodiments can readily be utilized in any number of other applications, such as data writing applications. It is to be understood that even though numerous characteristics and configurations of the present disclosure have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present technology.

What is claimed is:

1. An apparatus comprising a magnetic stack contacting a shield, the shield comprising a horizontal lamination of a magnetic layer laterally separated from a first non-magnetic layer by a second non-magnetic layer and vertically contacting the magnetic stack, the first and second non-magnetic layers comprising different materials, the magnetic layer having a first width at an air bearing surface (ABS) and first length from the ABS defining a first aspect ratio and a different second width and first length defining a different second aspect ratio distal the ABS.

2. The apparatus of claim 1, wherein the magnetic layer continuously extends from the ABS to a plane distal the ABS.

3. The apparatus of claim 1, wherein the first and second non-magnetic layers are aligned with the magnetic layer along an axis parallel to the ABS.

4. The apparatus of claim 3, wherein the second non-magnetic layer comprises Alumina.

5. The apparatus of claim 1, wherein the magnetic layer is disposed between the first non-magnetic layer and a third non-magnetic layer, the first and third non-magnetic layers each comprising a first material.

6. The apparatus of claim 1, wherein the magnetic layer is centered about the magnetic stack on the ABS.

7. The apparatus of claim 1, wherein the magnetic layer continuously extends along a first width and the magnetic stack extends along a second width, the first width being greater than the second width.

8. The apparatus of claim 1, wherein the magnetic layer is vertically offset from the magnetic stack on the ABS.

9. The apparatus of claim 8, wherein each non-magnetic layer is horizontally offset from the magnetic layer on the ABS.

10. The apparatus of claim 1, wherein the magnetic and non-magnetic layers each have a common thickness.

11. A data reader comprising a magnetic stack contacting a shield, the shield comprising a horizontal lamination of a magnetic layer laterally disposed between first and second and second non-magnetic laminations and vertically contacting the magnetic stack, the first non-magnetic lamination having a first non-magnetic layer separating a second non-magnetic layer from the magnetic layer, the second non-magnetic lamination having a third non-magnetic layer separating the magnetic layer from a fourth non-magnetic layer, the first and second non-magnetic layers comprising different materials, the magnetic layer having a first width at an air bearing surface (ABS) and first length from the ABS defining a first aspect ratio and a different second width and first length defining a different second aspect ratio distal the ABS, at least one non-magnetic layer contacting an electrical contact.

12. The data reader of claim 11, wherein the electrical contact contacts the at least one non-magnetic layer exclusively.

13. The data reader of claim 11, wherein the first and second aspect ratios are each less than 5:1.

14. The data reader of claim 11, wherein the magnetic stack comprises dual magnetically free layers without a fixed magnetization.

15. The data reader of claim 11, wherein at least one non-magnetic layer comprises a nickel alloy.

16. The data reader of claim 11, wherein the magnetic layer resides within an areal extent of the non-magnetic layers.

17. The data reader of claim 11, wherein the magnetic layer comprises permalloy.

18. A method comprising:
  contacting a first shield with a magnetic stack, the first shield comprising a horizontal lamination of a magnetic layer laterally separated from a first non-magnetic layer by a second non-magnetic layer and vertically contacting the magnetic stack, the first and second non-magnetic layers comprising different materials; and
  configuring the magnetic layer with a first width at an air bearing surface (ABS) and first length from the ABS defining a first aspect ratio and a different second width and first length defining a different second aspect ratio distal the ABS.

19. The method of claim 18, further comprising contacting a second shield with the magnetic stack, the second shield comprising a horizontal lamination of magnetic and non-magnetic layers.

20. The method of claim 19, wherein the magnetic and non-magnetic layers of the first and second shields are vertically aligned, respectively.

* * * * *